(12) United States Patent
Clere et al.

(10) Patent No.: US 10,545,940 B2
(45) Date of Patent: Jan. 28, 2020

(54) SUPPORTING SECURE LAYER EXTENSIONS FOR COMMUNICATION PROTOCOLS

(71) Applicant: Red Hat, Inc., Raleigh, NC (US)

(72) Inventors: Jean-Frederic Clere, Neuchâtel (CH); Stuart Wade Douglas, Sydney (AU)

(73) Assignee: Red Hat, Inc., Raleigh, NC (US)

( * ) Notice: Subject to any disclaimer, the term of this patent is extended or adjusted under 35 U.S.C. 154(b) by 151 days.

(21) Appl. No.: 15/439,441

(22) Filed: Feb. 22, 2017

(65) Prior Publication Data
US 2018/0241730 A1 Aug. 23, 2018

(51) Int. Cl.
*G06F 16/22* (2019.01)
*H04L 29/06* (2006.01)
*G06F 16/23* (2019.01)

(52) U.S. Cl.
CPC ......... *G06F 16/2255* (2019.01); *G06F 16/23* (2019.01); *H04L 63/0428* (2013.01); *H04L 63/123* (2013.01); *H04L 63/166* (2013.01)

(58) Field of Classification Search
CPC ... H04L 63/08; H04L 9/0841; H04L 63/0428; H04L 65/1069; H04L 63/123;
(Continued)

(56) References Cited

U.S. PATENT DOCUMENTS 5,657,390 A * 8/1997 Elgamal .................. H04L 29/06 713/151
5,696,599 A * 12/1997 Tiso .................... H04N 1/00127 358/434

(Continued)

FOREIGN PATENT DOCUMENTS

WO 2014067850 A1 5/2014
WO WO-2014067850 A1 * 5/2014 ........... H04L 63/166
(Continued)

OTHER PUBLICATIONS

Ali Abdulqader Bin-Salem et al., Survey of Cross-layer Designs for Video Transmission Over Wireless Networks, IETE Technical Review | vol. 29 | Issue 3 | May-Jun. 2012 (Year: 2012).*
(Continued)

*Primary Examiner* — Kambiz Zand
*Assistant Examiner* — Mahabub S Ahmed
(74) *Attorney, Agent, or Firm* — Lowenstein Sandler LLP

(57) ABSTRACT

An implementation of the disclosure provides an apparatus comprising: a memory to store a plurality of handshake responses to authenticate client communications; and a processing device, operatively coupled to the memory, to: receive a handshake request from a client device The handshake request comprising an identifier of a communication protocol supported by the client device. A secure layer extension is extracted from the identifier of the communication protocol. Identify, in view of the communication protocol, a handshake response for the client device. The handshake response is modified to include information associated with the secure layer extension. Update a data structure with a hash value generated in view of the modified handshake response. Thereupon, forward the modified handshake response and the hash value to the client device.

17 Claims, 5 Drawing Sheets

(58) Field of Classification Search
CPC ............. H04L 63/166; G06F 17/3033; G06F 17/30345; G06F 16/2255; G06F 16/23
USPC .......................................................... 726/7
See application file for complete search history.

(56) References Cited

U.S. PATENT DOCUMENTS

| | | | | |
|---|---|---|---|---|
| 6,931,528 | B1* | 8/2005 | Immonen | H04W 12/06 380/277 |
| 8,069,469 | B1* | 11/2011 | Atieh | H04L 63/1441 726/2 |
| 8,095,787 | B2* | 1/2012 | Kanekar | H04L 63/166 380/277 |
| 8,707,027 | B1* | 4/2014 | Naik | H04L 63/0823 380/258 |
| 8,738,902 | B2* | 5/2014 | Yoo | H04L 63/0823 713/156 |
| 9,077,754 | B2* | 7/2015 | Gonuguntla | H04L 63/0281 |
| 9,531,691 | B2* | 12/2016 | Gero | H04L 9/0643 |
| 9,825,911 | B1* | 11/2017 | Brandwine | H04L 63/0236 |
| 10,091,247 | B2* | 10/2018 | Kumar | H04L 63/20 |
| 2001/0016907 | A1* | 8/2001 | Kang | H04L 63/0428 713/152 |
| 2003/0069852 | A1* | 4/2003 | Martin | G06Q 30/018 705/52 |
| 2003/0135625 | A1* | 7/2003 | Fontes | H04L 63/12 709/228 |
| 2006/0041938 | A1* | 2/2006 | Ali | G06Q 20/341 726/14 |
| 2006/0116148 | A1* | 6/2006 | Bahl | H04W 28/18 455/517 |
| 2006/0161975 | A1* | 7/2006 | Diez | H04L 63/0823 726/18 |
| 2006/0294366 | A1* | 12/2006 | Nadalin | H04L 63/061 713/156 |
| 2007/0239886 | A1* | 10/2007 | Montemayor | H04L 63/02 709/232 |
| 2008/0022085 | A1* | 1/2008 | Hiltgen | H04L 63/0428 713/155 |
| 2008/0046727 | A1* | 2/2008 | Kanekar | H04L 63/166 713/168 |
| 2008/0161114 | A1* | 7/2008 | Wang | H04L 63/0428 463/42 |
| 2009/0083372 | A1* | 3/2009 | Teppler | H04L 9/3226 709/203 |
| 2010/0034384 | A1* | 2/2010 | Bucker | H04L 63/0442 380/262 |
| 2010/0272030 | A1* | 10/2010 | Babbar | H04L 47/10 370/329 |
| 2012/0307801 | A1* | 12/2012 | Olsson | H04W 36/0022 370/331 |
| 2013/0198511 | A1* | 8/2013 | Yoo | H04L 63/0823 713/156 |
| 2013/0297814 | A1* | 11/2013 | Annamalaisami | H04L 69/08 709/230 |
| 2013/0346957 | A1* | 12/2013 | Khandelwal | G06F 8/656 717/170 |
| 2014/0280791 | A1* | 9/2014 | DeCusatis | H04L 69/22 709/220 |
| 2014/0304498 | A1* | 10/2014 | Gonuguntla | H04L 63/168 713/151 |
| 2014/0337614 | A1* | 11/2014 | Kelson | H04L 63/168 713/152 |
| 2014/0376384 | A1* | 12/2014 | Bandyopadhyay | H04W 24/02 370/241 |
| 2015/0106624 | A1* | 4/2015 | Gero | H04L 9/0643 713/171 |
| 2016/0094602 | A1* | 3/2016 | Fuh | H04L 65/60 709/219 |
| 2016/0094686 | A1* | 3/2016 | Yasuma | H04L 69/18 709/230 |
| 2016/0277446 | A1* | 9/2016 | Kumar | H04L 63/20 |
| 2016/0308935 | A1* | 10/2016 | Sakai | H04L 67/02 |
| 2016/0315913 | A1* | 10/2016 | Lu | H04L 65/1069 |
| 2016/0330095 | A1* | 11/2016 | Numakami | H04L 67/02 |
| 2016/0330269 | A1* | 11/2016 | Alstad | H04L 67/06 |
| 2017/0026481 | A1* | 1/2017 | Stephan | H04L 67/2814 |
| 2017/0111334 | A1* | 4/2017 | Gero | H04L 9/0643 |
| 2018/0007172 | A1* | 1/2018 | Wang | H04L 69/02 |
| 2018/0167401 | A1* | 6/2018 | Lin | H04L 63/123 |

FOREIGN PATENT DOCUMENTS

| | | | | |
|---|---|---|---|---|
| WO | 2015080661 | A1 | 6/2015 | |
| WO | WO-2015080661 | A1 * | 6/2015 | ............ H04W 76/18 |
| WO | WO-2016111914 | A1 * | 7/2016 | ............ H04L 67/24 |

OTHER PUBLICATIONS

Lee Breslau et al., Advancves in Network Simulations, 2000 IEEE (Year: 2000).*
Weilian Su et al., Cross-Layer Design and Optimization forWireless Sensor Networks, Artificial Intelligence, Networking, and Parallel/Distributed Computing (SNPD'06) (Year: 2006).*
Document from Goole Search, NPN and ALPN (Mar. 20, 2013) (Year: 2013).*
S. Friedl et al., Transport Layer Security (TLS) Application-Layer Protocol Negotiation Extension, Internet Engineering Task Force (IETF), 2014 (Year: 2014).*
"HTTP/2 Java 8, Jetty and ALPN", Oct. 2016, 2 pages http://stackoverflow.com/questions/39856972/http-2-java-8-jetty-and-alpn.
S. Friedl, et al., "Transport Layer Security (TLS) Application-Layer Protocol Negotiation Extension", Cisco Systems, Inc., Microsoft Corp., Google Inc., Jul. 2014, 9 pages.
Eric Costlow, "Diagnosing TLS, SSL, and HTTPS", Java Platform Group, Product Management blog, Jul. 2, 2014, 7 pages.
"JDK 8 Security Enhancements", Copyright 1993, 2016, Oracle and/or its affiliates, 3 pages https://docs.oracle.com/javase/8/docs/technotes/guides/security/enhancements-8.html.
Simon, "Last NPN & ALPN Update for JDK 7", Webtide, Apr. 15, 2015, 2 pages https://webtide.com.

* cited by examiner

400

410 Receive a handshake request from a client device, the handshake request comprises an identifier for a communication protocol supported by the client device and a secure layer extension

420 Generate a handshake response in view of the identifier associated with the communication protocol

430 Update the handshake response to include extension information associated with the secure layer extension identifier

440 Provide a hash value in view of the updated handshake response

450 Transmit the updated handshake response and the hash value to the client device to indicate that the handshake request is complete

FIG. 4

SUPPORTING SECURE LAYER EXTENSIONS FOR COMMUNICATION PROTOCOLS

TECHNICAL FIELD

The implementations of the disclosure relate generally to secured network communications and, more specifically, relate to supporting secure layer extensions.

BACKGROUND

Centralized management of remote computing environments may provide remote access to system resources, such as data and application resources, with the added benefit of providing management for implementing security protocols to protect the resources from malicious intrusions. In such cases, a server may provision applications and/or data to a client device of a user to deliver computing and/or application services in a variety of ways. In some situations, the server may support particular network communication protocols that may implement different features, such as security mechanisms, to verify communications with the client devices that may remotely access the system resources.

BRIEF DESCRIPTION OF THE DRAWINGS

The disclosure is illustrated by way of examples, and not by way of limitation, and may be more fully understood with references to the following detailed description when considered in connection with the figures, in which:

FIG. 4 illustrates a flow diagram illustrating another method for supporting secure layer extensions for communication protocols according to an implementation of the disclosure.

DETAILED DESCRIPTION

Figure 1:
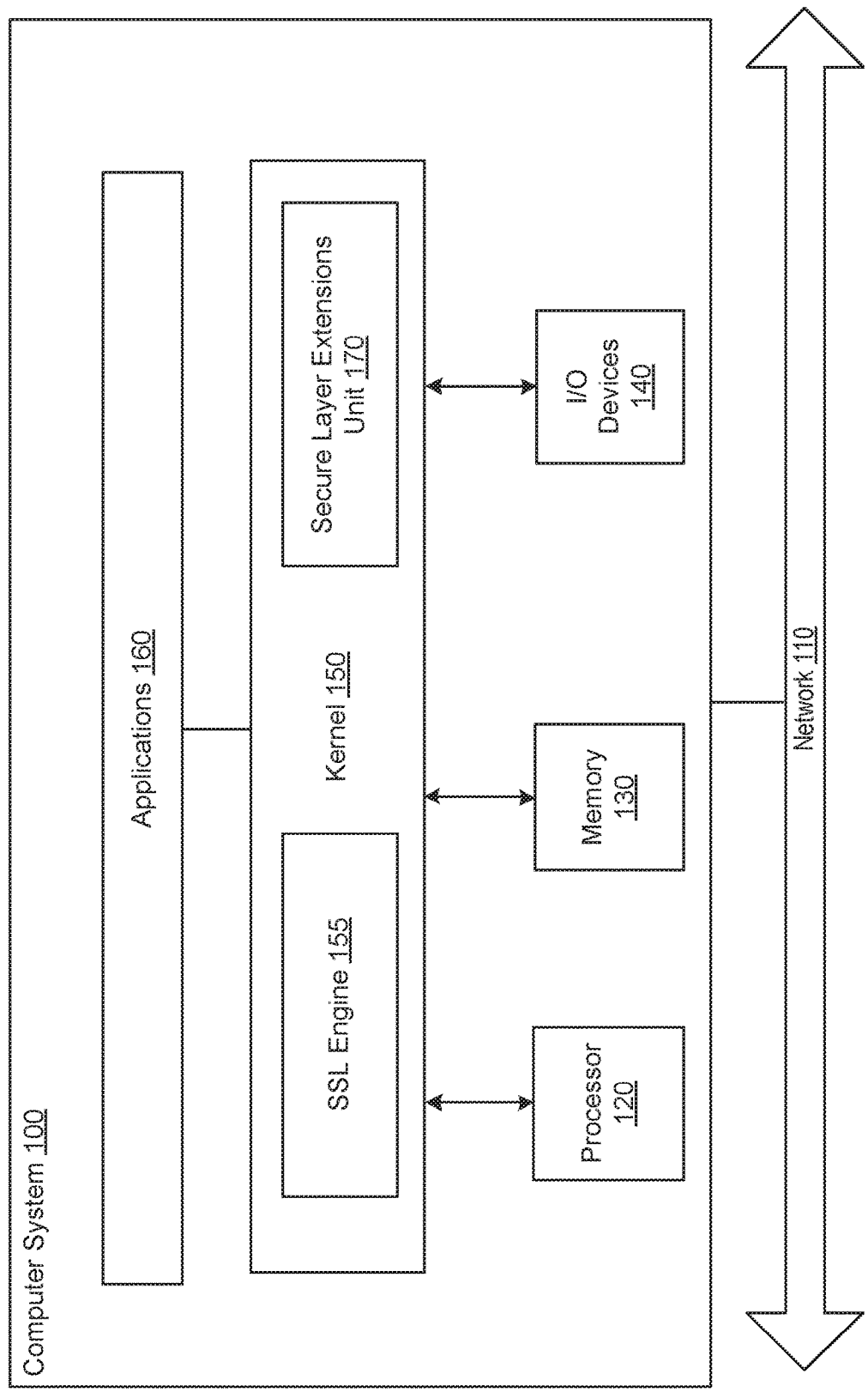
FIG. 1 is a block diagram of a system to support secure layer extensions for communication protocols according to implementations of the disclosure may operate.

A client device (e.g., a smartphone running a web browser) may establish a session, such as a transport layer security (TLS) communication session, with a server device. In some situations, the sever device may be a secure sockets layer (SSL)/TLS enabled server. The SSL/TLS enabled server allows the client to establish a secure connection layer over an unsecured network (e.g., the Internet) that prevents eavesdropping, tampering and message forgery. SSL/TLS is a protocol between an application protocol (e.g., HTTP) and a transport protocol (TCP) associated with the network. The SSL/TLS protocol provides endpoint authentication and communications privacy over the unsecured network using cryptography. For example, the SSL/TLS protocol may take messages to be transmitted, fragments the data of the message into manageable blocks, optionally compresses the blocks, applies a cryptographic function, and then transmits the results.

To establish a TLS communication session using a specific SSL/TLS protocol, a client device typically initiates a handshaking process with a server device. During this handshake process, the client device and server device agree on various parameters used to establish security of the connection. In one implementation, the client initiates the handshaking process by sending a "Client Hello" message frame to the server device. The message frame may include, for example, the highest SSL/TLS protocol version supported by the client, a random number (used as a session key) and a list of cryptographic algorithms supported by the client device. The list of cryptographic algorithms may include a list of ciphers, such as an RSA cipher, Ephemeral Diffie-Hellman (DHE) cipher, Data Signature Standard (DSS) cipher, or the like, supported by the client device to encrypt data transmissions. The server device may respond with a response message frame that includes the chosen protocol version, another random number (used as a session key) and a cryptographic algorithm selected from the choices listed by the client device.

In some implementations, the server device may include a SSL application that is used for establishing the TLS communication session with the client device. For example, the server device may include a secure socket layer engine (SSL Engine) that may implement certain communication protocols for the TLS communication session. In one implementation, the server device may generate the SSL Engine using, for example, certain application instructions. In some implementations, the SSL Engine may be generated by using various hardware and/or software combinations. The SSL Engine may enable the server device to transmit and/or receive secure communications from the client device. For example, the SSL Engine may implement the handshaking process between the server and client devices.

The completion of the handshaking process includes generating a hash value based on all the protocol messages sent between the server and client devices during the handshake. For example, the SSL Engine generates the hash value by using all of sent and received the protocol messages as input into a particular hash function. The hash function that is used is also negotiated by the devices during the handshaking process. The SSL Engine may store the hash value, for example, in memory, so that it can be used for verifying subsequent communications between the devices by comparing the stored hash value with a hash value received from a client. For example, the client device may also generate the hash value using the agreed upon hash function and all the protocol messages transmitted during the handshaking process.

The client device sends an encrypted client-finished message comprising the hash value as part of the handshaking process. In turn, the server device decrypts and attempts to verify the hash value in the message against the hash value is stored by the SSL Engine. If the verification fails (e.g., the hash values do not match), the handshake is considered to have failed and the secured connection is not established between the devices. Otherwise, the server device sends a server-finished message which indicates the server is satisfied with the client and is ready to begin the actual data transfers through the secured connection.

Some client devices may support certain secure layer extensions of a particular SSL/TLS protocol version that is not supported by a server device. For example, the latest or new version of a particular web browser may not be able to connect to an older version of certain web servers. In such cases, the request to establish a secure connection between the devices may be unable to use particular features of the new version of the web browser. For example, during handshaking process, the client device may indicate that it is using a new version of a certain protocol, such as a Hypertext Transfer Protocol (HTTP), and/or a particular version of that protocol, which is not yet been supported by a programming platform (e.g., JDK) used to implement the SSL Engine of the server device. For example, the secure layer extensions may include an application-layer protocol negation (APLN) extension. The APLN allows the application layer to negotiate which protocol should be performed over a secure connection in a manner which avoids additional round trips between the devices. It may be used by some communication protocols such as HTTP/2.0.

To circumvent such problems, some server devices may implement a process to overwrite portions of the server platform to accept the secure layer extensions of the client's protocol. For example, this may involve implementing modifications to the JDK so that it can support new TLS protocol extensions, such as APLN. This process, however, may not be portable over the different server devices in the remote computing environment. Moreover, there may be significant overhead to keep the process up to date with changing secure layer extensions. Furthermore, any modifications by the process to the server platform may violate certain vendor licensing agreements.

Implementations of the disclosure address the above-mentioned and other deficiencies by providing a plugin (e.g., hardware/software component, circuitry, dedicated logic, programmable logic, microcode, etc.) to support secure layer extensions, such as for SSL/TLS protocols. The plugin may implement additional secure layer extensions by modifying handshake messages of the SSL Engine so that extension information ends up on the messages as if it were produced by the SSL Engine. For example, the hello server message typically produced by the SSL Engine is modified to include data elements related to the secure layer extension or any other enhancement to the SSL/TLS protocol that is not currently supported by the SSL engine. In addition, the plugin updates internal memory of the SSL Engine using, for example, specific programing application interface (API) calls to manipulate runtime objects, so that SSL Engine's internal hash of handshakes matches what is actually sent over the communication session. Thus, an advantage of using the kernel-based plugin is that it allows additional secure layer extensions to be supported without the increased overhead or portability issues regarding any modifications to the server platform used to implement the SSL Engine.

When a client attempts to connect to the server, the client sends a "client hello" message advertising that it supports a certain SSL/TLS protocol. The plugin at the server reads this message and parses it before the message is passed into the SSL Engine. To parse the message, the plugin extracts the secure layer extension information from a portion of the "client hello" message. When the message is passed to into the SSL Engine, the SSL Engine generates a "server hello" handshake response that may ignore the secure layer extension information. This is because the SSL Engine may not support this extension. The plugin modifies the handshake response to include information about the secure layer extension. Thereafter, the plugin uses a reflection mechanism to update internal memory of the SSL Engine with the modified the handshake response. The reflection mechanism may include an API that allows data elements of an application (such as the SSL Engine) to be discovered and manipulated at runtime. For example, the reflection mechanism may be implemented in certain programing languages (e.g., Java) that provide classes and/or interfaces for obtaining information about classes and other type of objects at runtime. This allows programmatic access to information about the fields, data, methods and other information loaded into the runtime object. The plugin uses the "reflection" mechanism to update a hash value of the handshake within the internal memory so that the SSL Engine does not reject the modified handshake as being tampered with, for example, by an authorized intruder. As a result, the SSL Engine of the server may verify the client-finished message as valid to complete the handshake process.

FIG. 1 is a block diagram of a computer system 100 in which implementations of the disclosure may operate. The computer system 100 may support secure layer extensions for communication protocols. As shown, the computer system 100 may be coupled to a network 110 and include a processor 120 communicatively coupled to a memory 130 and an input/output I/O device 140.

"Processor" herein refers to a device capable of executing instructions encoding arithmetic, logical, or I/O operations. In one illustrative example, a processor may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). The processor 120 may also be referred to as a central processing unit (CPU). "Memory" herein refers to a volatile or non-volatile memory device, such as RAM, ROM, EEPROM, or any other device capable of storing data. "I/O device" herein refers to a device capable of providing an interface between a processor and an external device capable of inputting and/or outputting binary data. Although, for simplicity, a single processor 120 is depicted in FIG. 1, in some other embodiments computer system 100 may comprise a plurality of processors. Similarly, in some other embodiments computer system 100 may comprise a plurality of I/O devices, rather than a single device 140.

The computer system 100 may be a server, a mainframe, a workstation, a personal computer (PC), a mobile phone, a palm-sized computing device, etc. The network 110 may be a private network (e.g., a local area network (LAN), a wide area network (WAN), intranet, etc.) or a public network (e.g., the Internet). Computer system 100 may run a kernel 150 that manages the hardware resources of the computer system and that provides functions such as inter-process communication, scheduling, memory management, and so forth. In some implementations, the kernel 150 can take many forms. For example, the kernel 150 may be a software component, such as a "host" operating system executed by the processor 120. In other implementations, the kernel 150 may be a hypervisor also referred to as a virtual machine monitor. The hypervisor may be part of or incorporated in the host operating system of computer system 100, or the hypervisor may be running on top of the host operating system. Alternatively, the hypervisor may a "bare metal" hypervisor that runs on hardware of computer system 100 without an intervening operating system.

The kernel 150 may support a plurality of applications 160 residing on the computer system 100. These applications 160 may include, for example, user application processes, virtual machines, containers and the like. In some implementations, the kernel 150 is a central component of system 100, as it is a bridge between the applications 160 and the actual data processing done at a hardware level of the system 100. The kernel's 150 responsibilities include managing the system's 100 resources (the communication between hardware and software components). The kernel 150 can provide the lowest-level abstraction layer for the resources (especially the processor 120, memory 130 and I/O devices 140) that the applications 160 may control to perform their function. The kernel 150 typically makes these resources available to the applications 160 through inter-process communication mechanisms and system calls.

In some implementations, computer system 100 may provide access to system resources, such as the processor 120, memory 130 and I/O devices 140 and data of the applications 160, to various client devices (not shown). In this regard, the computer system 100 may support a secure communication session (e.g., TLS communication session) with the client device via network 110. The client device may initiate a handshaking process with the computer system 100 to establish the secure communication session.

To implement the handshake process, the computer system 100 may include a secure socket layer engine (SSL Engine) 155. In some embodiments, the SSL Engine 155 may include various hardware and/or software combinations. The SSL Engine 155 may enable the computer system 100 to transmit and/or receive secure communications from the client device. For example, the SSL Engine 155 may store a hash value associated with the handshake process, for example, in memory 130, which can be used for verifying communications between computer system 100 and the client device. The hash value is a result produced by performing hash operations, using a hashing function, on protocol messages between the system and client device during the handshake process. During this handshake process, the computer system 100 and client device may agree on various parameters used to establish security of the connection. Some of these parameters may include certain secure layer extensions support by a particular SSL/TLS protocol.

In various implementations, the kernel 150 of system 100 may include a plugin, such as secure layer extensions unit 170, which is installed to provide support for the secure layer extensions regardless of whether they have been implemented by the SSL Engine 155. In some implementations, the secure layer extensions unit 170 may modify inbound and outbound handshake messages of the SSL Engine 155 so that extension information ends up on the messages as if they were produced by the SSL Engine 155. In addition, the secure layer extensions unit 170 updates an internal hash of the SSL Engine 155 so that the hash of handshakes between the system 100 and the client device matches what is actually sent over the communication session. The functionally of the secure layer extensions unit 170 can exist in a fewer or greater number of modules than what is shown, with such modules residing at one or more components of computer system 100, which may be geographically dispersed. The secure layer extensions unit 170 may be operable in conjunction with the kernel 150 from which it may receive and determine relevant information regarding parameters of the communication session as discussed in more detail below.

Figure 2:
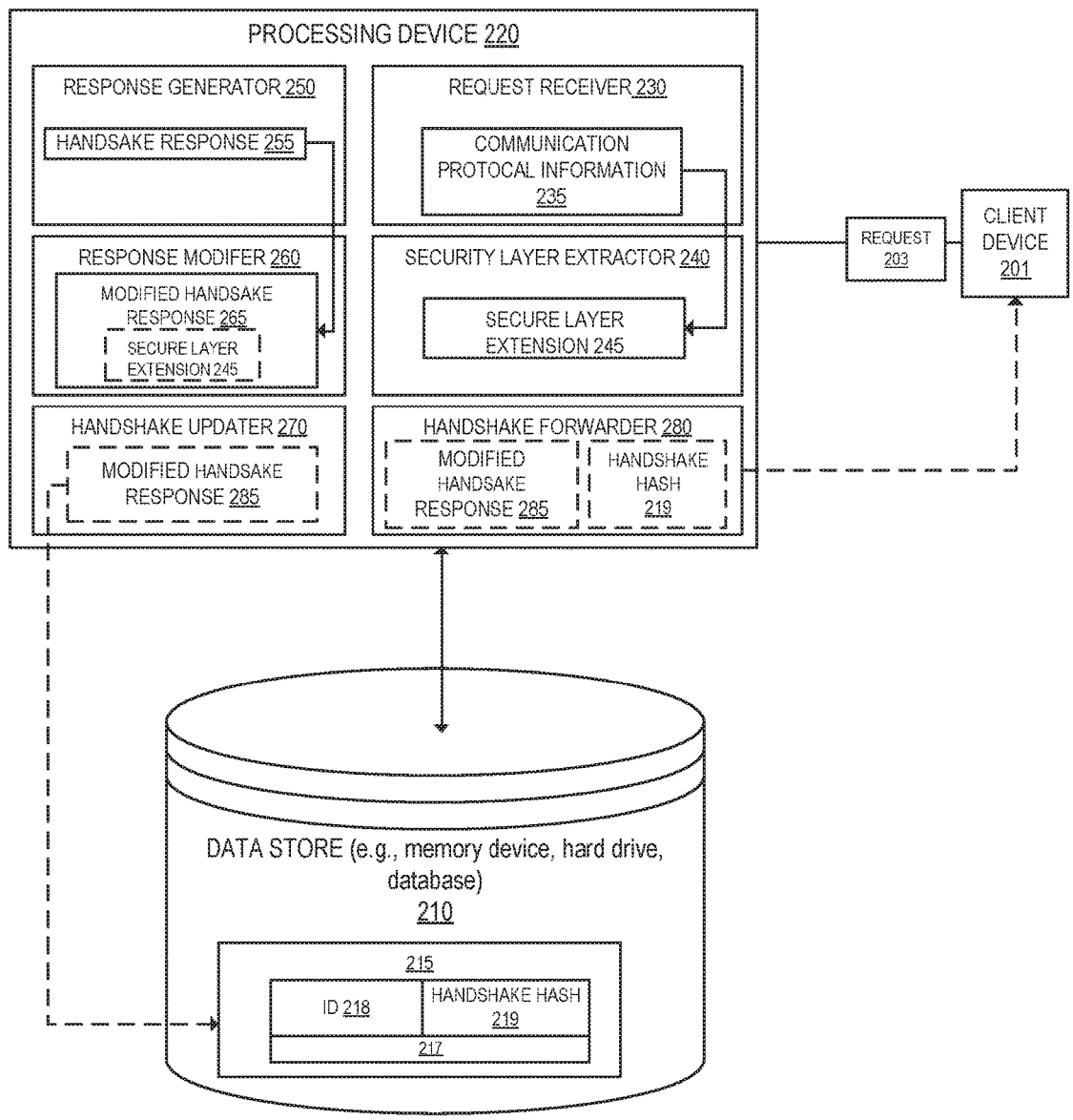
FIG. 2 is a block diagram of an apparatus including a memory for supporting secure layer extensions for communication protocols according to an implementation of the disclosure.

FIG. 2 is a block diagram of an apparatus 200 including a memory 210 for supporting secure layer extensions for communication protocols according to an implementation of the disclosure. The apparatus 200 may be the same or similar to a components within the computer system 100 of FIG. 1. In some implementations, the apparatus 200 may be installed in kernel 150. Apparatus 200 may include components for supporting secure layer extensions for communication protocols. In some implementations, the apparatus 200 may include a data store 210 (which may be the memory device 130 of FIG. 1) and a processing device 220 (which may be the processor 120 of FIG. 1) coupled to the data store 210.

In some implementations, the processing device 220 may execute instructions for carrying out the operations of the apparatus 200 as discussed herein. As shown, the apparatus 200 may execute instructions for a connection request receiver 230, a security layer extractor 240, a response generator 250, a response modifier 260, a handshake updater 270 and a handshake forwarder 280 to that may forward a response to a client, such as client device 201, that the apparatus 200 is ready to begin data transfers through a secured connection.

Data store 210 may include any non-persistent data storage (e.g., memory), persistent and/or volatile data storage (e.g., flash storage, hard drive, tape), other medium, or combination thereof that is capable of storing instructions for carrying out the operations of the apparatus 200 discussed herein. In some implementations, the data store 210 may store a data structure 215 associated with an SSL Engine, such as SSL Engine 155, that operates in conjunction with the apparatus 200. The data structure 215 may in memory that is only accessible by the SSL Engine 115.

In one implementation, the data structure 215 may be a table, array, and the like that comprises a plurality of entries 217. Each entry 217 may include an identifier 218 (such as a MAC address) of a client device 201 and a handshake hash 219 representing a hash value based on all the protocol messages sent between the apparatus 200 and client device 201 during the handshake process. For example, the SSL Engine 155 generates the handshake hash 219 by using all of the protocol messages as input into a particular hash function agreed upon during the handshaking process. The SSL Engine 155 may store the handshake hash 219 so that it can be used for verifying subsequent communications between the devices during a TLS communication session.

In some implementations, the SSL Engine 155 may implement certain SSL/TLS communication protocols for the TLS communication session. In that regard, the apparatus 200 may implement additional extensions associated with the SSL/TLS communication protocols that are not currently supported by the platform associated with the SSL Engine 155. For example, the additional extensions may be associated with a latest version of the communication protocol that has not yet been implemented by the SSL Engine 155. As noted above, the SSL Engine 155 may implement for the apparatus 200, a handshaking process with the client device 201 to establish a secure TLS communication session between the devices.

In operation of the apparatus 200, the connection request receiver 230 receives a handshake request from a client device, the handshake request 203 comprising an identifier of a communication protocol 235 supported by the client device 201. For example, the client device 201 may send the request 203 to initiate the handshaking process. During this handshake process, the client device 201 may agree on various parameters used to establish the secure connection.

In one implementation, the request 203 may include a "Client Hello" message frame comprising communication protocol information 235, a random number (used as a session key) and a list of cryptographic algorithms supported by the client device. The cryptographic algorithms are used to encrypt subsequent message sent between the devices.

In some embodiments, the communication protocol 235 may include information regarding the highest SSL/TLS protocol version that the client 201 supports. For example, the communication protocol information 235 is based on a particular protocol specification that encapsulates the many data elements and related fields needed to establish a secure connection in accordance with the protocol. This secure connection allows client/server devices to communicate in a way that is designed to prevent eavesdropping, tampering, or message forgery.

The security layer extractor 240 extracts a secure layer extension identifier 245 from the communication protocol 235. For example, the secure layer extension identifier 245 may be an extension to a TLS protocol. In some embodiments, according to the communication protocol 235 may indicate that messages to be transmitted should include certain fields for the length, description, and content of the message. In some embodiments, the secure layer extension 245 is an application-layer protocol negation (APLN) extension. The APLN allows the application layer to negotiate which protocol should be performed over a secure connection in a manner which avoids additional round trips between the devices. It may be used by some communication protocols such as HTTP/2.0. The secure layer extension identifier 245 may include information regarding additional fields supported by the communication protocol. In one embodiment, the security layer extractor 240 can determine the presence of the extensions of secure layer extension identifier 245 by determining whether there is information at the end of the client's "Client Hello" message frame. In some embodiments, "Client Hello" message frame may include an explicit extensions field that the security layer extractor 240 can identify to extract the secure layer extension identifier 245.

In some embodiments, the response generator 250 generates a handshake response 255 in view of the communication protocol 235 supported by the client device 201. For example, the response generator 250 may identify the "Client Hello" message in the request 203. The response generator 250 then passes the message into to the SSL Engine 155 which in turn returns a "Server Hello" handshake response 255. In some embodiments, the handshake response 255 may include hash value, such as the handshake hash 219. For example, the SSL Engine 155 generates the hash value by using the transmitted protocol messages as input into an agreed upon hash function.

Turning to the response modifier 260, it modifies the handshake response 255 to include extension information associated with the secure layer extension identifier 245. In some implementations, the response modifier 260 may append or otherwise alter the handshake response 255 to include information regarding the extensions. For example, in certain SSL/TLS communication protocols (e.g., HTTP/2), an extension part (e.g., specified fields) of the handshake response 255 is modified by the response modifier 260 to include information that indicates that apparatus 200 supports ALPN, and has elected to use the HTTP/2 protocol for secure communications. In some embodiments, the response modifier 260 may update an extension field of the handshake response 255 to include the secure layer extension 245 information. In other embodiments, the response modifier 260 may append the secure layer extension 245 information to an end of the Server Hello" handshake response 255. With respect to the handshake updater 270, it updates the data structure 215 with a hash value (e.g., handshake hash 219) generated in view the modified handshake response. The hash value indicates that the modified handshake response 285 is valid. For example, the handshake updater 270 uses the modified handshake response 285 as input into the agreed upon hash function to generate a new handshake hash. The handshake updater 270 then updates or otherwise replaces or the handshake hash 219 that was stored by the SSL engine 115 in the data structure 215 with the newly generated handshake hash based on the modified handshake response 285

To update the data structure 215 with the replacement for the handshake hash 219, the handshake updater 270 may use various mechanisms. In some embodiments, the handshake updater 270 uses a "reflection" mechanism to update the data structure 215 with the modified the handshake response. The "reflection" mechanism may include an API that allows data elements of an application (such as the SSL Engine) to be discovered and manipulated at runtime. The handshake updater 270 uses the "reflection" mechanism to update the internal "hash value" state of the handshake so that the SSL Engine does not reject the modified handshake as invalid.

Thereupon, the handshake forwarder 280 forwards the modify handshake response 270 and the handshake hash 219 to the client device 201. This may indicate that the client device 201 is securely connected. For example, the handshake provider 280 may transmit handshake response 270 to the client device 201. In response, the client device 201 sends an (encrypted) client-finished message that includes the handshake hash 219 associated with the handshake response 270. In turn, the processing device 220 (decrypts and) attempts to verify the hash value in the message against what is stored by the SSL Engine 155.

If the verification fails (e.g., the hash values do not match), the handshake is considered to have failed and the secured connection is not established between the devices. Otherwise, the processing device 220 indicates that is satisfied with the client device 201 and is ready to begin the actual data transfers through the secured connection. At this point, the handshake process is complete and an application layer protocol may be enabled with the client device 201.

Figure 3:
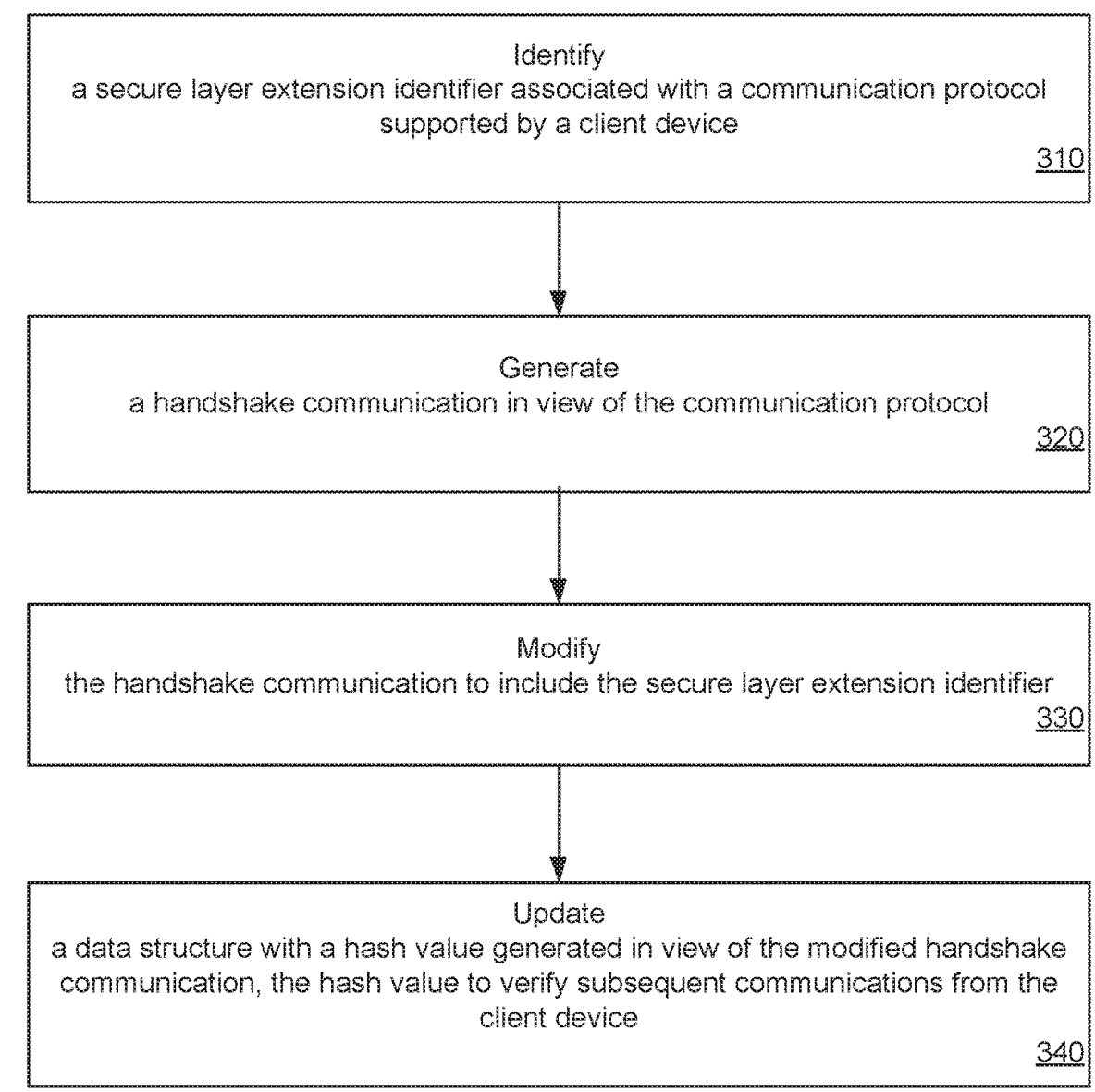
FIG. 3 illustrates a flow diagram illustrating a method for supporting secure layer extensions for communication protocols according to an implementation of the disclosure.

FIG. 3 depicts a flow diagram of one implementation of a method 300 in accordance with one or more aspects of the disclosure. In one implementation, the secure layer extensions unit 170 as executed by the processor 120 of FIG. 1 or the processing device 220 of FIG. 2 may perform method 300 to support secure layer extensions for communication protocols. The method 300 may be performed by processing logic that may comprise hardware (circuitry, dedicated logic, etc.), software (such as is run on a general purpose computer system or a dedicated machine), or a combination of both. Alternatively, in some other implementations, one or more processors of the computer device executing the method may perform routines, subroutines, or operations may perform method 300 and each of its individual functions. In certain implementations, a single processing thread may perform method 300. Alternatively, two or more processing threads with each thread executing one or more individual functions, routines, subroutines, or operations may perform method 300. It should be noted that blocks of method 300 depicted in FIG. 3 can be performed simultaneously or in a different order than that depicted.

Referring to FIG. 3, at block 310, method 300 identifies a secure layer extension identifier 245 associated with communication protocol 235 supported by a client device 201. In block 320, a handshake communication 255 is generated in view of the communication protocol 235. The handshake communication 255 is modified to include the secure layer extension identifier 245 in block 330. In block 340, a data structure 215 is updated with a hash value 219 generated in view of the modified handshake communication 285. The hash value 219 to verify subsequent communications from the client device 201.

FIG. 4 depicts a flow diagram of one implementation of a method 400 in accordance with one or more aspects of the disclosure. In one implementation, the secure layer extensions unit 170 as executed by the processor 120 of FIG. 1 or the processing device 220 of FIG. 2 may perform method 400 to support secure layer extensions for communication protocols. The method 400 may be performed by processing logic that may comprise hardware (circuitry, dedicated logic, etc.), software (such as is run on a general purpose computer system or a dedicated machine), or a combination of both. Alternatively, in some other implementations, one or more processors of the computer device executing the method may perform routines, subroutines, or operations may perform method 400 and each of its individual functions. In certain implementations, a single processing thread may perform method 400. Alternatively, two or more processing threads with each thread executing one or more individual functions, routines, subroutines, or operations may perform method 400. It should be noted that blocks of method 400 depicted in FIG. 4 can be performed simultaneously or in a different order than that depicted.

Referring to FIG. 4, at block 410, method 400 receives a handshake request 203 from a client device 201. The handshake request 203 comprises an identifier of a communication protocol 235 supported by the client device 201 and a secure layer extension 245. In block 420, a handshake response 255 is generated in view of the identifier associated with the communication protocol 235. The handshake response 255 is updated to include extension information associated with the secure layer extension 245 in block 430. In block 440, a hash value 219 in view of the updated handshake response 285. In block 450, the update handshake response 285 and the hash value 219 is transmitted to the client device 201 to indicate that the handshake request 203 is complete.

Figure 5:
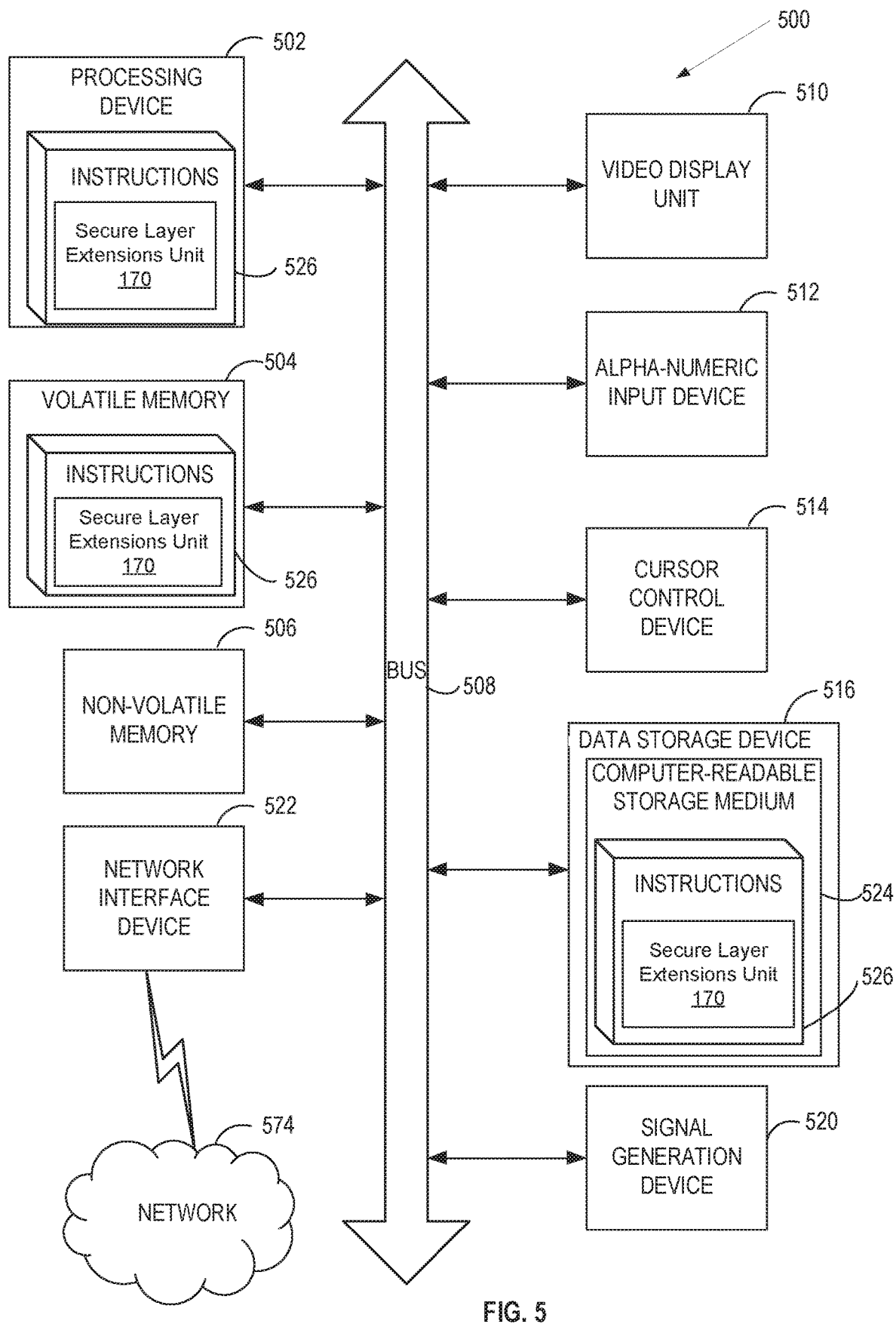
FIG. 5 illustrates a block diagram illustrating a computer system in which implementations of the disclosure may be used.

FIG. 5 depicts a block diagram of a computer system 500 operating in accordance with one or more aspects of the disclosure. In various illustrative examples, computer system 500 may correspond to a processing device within system 100 of FIG. 1 or the apparatus 200 of FIG. 2 respectively. In some embodiments, the computer system 500 may support secure layer extensions for communication protocols. The computer system 500 may be included within a data center that supports virtualization. Virtualization within a data center results in a physical system being virtualized using virtual machines (e.g., applications 110 of FIG. 1) to consolidate the data center infrastructure and increase operational efficiencies.

A virtual machine (VM) may be a program-based emulation of computer hardware of the virtualized data center. For example, the VM may operate based on computer architecture and functions of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein for live storage domain decommissioning.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 610 (e.g., an LCD), an alphanumeric input device 512 (e.g., a keyboard), a cursor control device 614 (e.g., a mouse), and a signal generation device 520.

Data storage device 516 may include a computer-readable storage medium 524 (e.g., a non-transitory computer-readable storage medium) on which may store instructions 526 encoding any one or more of the methods or functions described herein, including instructions encoding the Secure Layer Extensions Unit 170 of FIG. 1 for implementing method 300 of FIG. 3 or method 400 of FIG. 4 for supporting secure layer extensions for communication protocols.

Instructions 526 may also reside, completely or partially, within volatile memory 504 and/or within processing device 502 during execution thereof by computer system 600, hence, volatile memory 504 and processing device 502 may also constitute machine-readable storage media.

While non-transitory computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs. Unless specifically stated otherwise, terms such as "receiving," "extracting," "providing," "modifying," "identifying," "transmitting," "generating" or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300 and/or each of its individual functions, routines, subroutines, or operations. Examples of the structure for a variety of these systems are set forth in the description above.

It is to be understood that the above description is intended to be illustrative, and not restrictive. Many other implementation examples will be apparent to those of skill in the art upon reading and understanding the above description. Although the disclosure describes specific examples, it will be recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. An apparatus comprising:
a memory to store handshake data to authenticate client communications, the handshake data comprising a plurality of hash values; and
a processor, operatively coupled to the memory, to execute a secure layer extensions unit to:
receive, from a client device, a handshake request comprising an identifier of a communication protocol supported by the client device;
determine a portion of the identifier of the communication protocol that comprises a secure layer extension that is not supported by a secure sockets layer (SSL) engine of the apparatus;
extract the portion of the identifier that comprises the secure layer extension from the identifier of the communication protocol to generate a modified handshake request that excludes information associated with the secure layer extension;
provide the modified handshake request to the SSL engine;
receive, from the SSL engine, a handshake response in view of the communication protocol of the handshake request, wherein the handshake response excludes information associated with the secure layer extension;
generate, in view of the communication protocol, a modified handshake response for the client device that includes the information associated with the secure layer extension;
update a data structure with a hash value generated in view of the modified handshake response, the data structure comprising the handshake data; and
forward the modified handshake response and the hash value to the client device.

2. The apparatus of claim 1, wherein the processor is further to identify, in view of the secure layer extension, an application-layer protocol negotiation (APLN) extension for the communication protocol.

3. The apparatus of claim 2, wherein the processor is further to update a field in the handshake response in view of the APLN extension.

4. The apparatus of claim 2, wherein the processor is further to append the APLN extension to the handshake response.

5. The apparatus of claim 1, wherein the processor is further to:
identify a hash function in the handshake request from the client device; and
generate the hash value for the modified handshake response using the hash function.

6. The apparatus of claim 5, wherein the processor is further to replace a hash value in the data structure with the generated hash value associated with the modified handshake response.

7. A method comprising:
identifying, by a processor executing a secure layer extensions unit, a secure layer extension identifier associated with a communication protocol supported by a client device;
determining that a secure layer extension is not supported by a secure sockets layer (SSL) engine in view of the secure layer extension identifier;
receiving from a secure sockets layer (SSL) engine a handshake communication in view of the communication protocol, wherein the handshake communication excludes the secure layer extension identifier;
generating, by the processor executing the secure layer extensions unit, a modified handshake communication for the client device that includes the secure layer extension identifier in view of the communication protocol;
updating, by the processor executing the secure layer extensions unit, a data structure with a hash value generated in view of the modified handshake communication, the hash value to verify subsequent communications from the client device; and forwarding the modified handshake communication and the hash value to the client device.

8. The method of claim 7, further comprising identifying, in view of the secure layer extension, an application-layer protocol negotiation (APLN) extension for the communication protocol.

9. The method of claim 8, further comprising updating a field in the handshake communication in view of the APLN extension.

10. The method of claim 8, further comprising appending the APLN extension to the handshake communication.

11. The method of claim 7, further comprising:
identifying a hash function associated with the client device; and
generating the hash value for the modified handshake communication using the hash function.

12. The method of claim 11, further comprising replacing a hash value in the data structure with the generated hash value for the modified handshake communication.

13. A non-transitory computer-readable storage medium comprising instructions that, when executed by a processing device, cause the processing device to execute a secure layer extensions unit to:
receive, by the processing device executing the secure layer extensions unit, a handshake request from a client device, the handshake request comprising an identifier for a communication protocol supported by the client device and a secure layer extension;
determine that the secure layer extension is not supported by a secure sockets layer (SSL) engine;
generate a modified handshake request that excludes information associated with the secure layer extension;
provide the modified handshake request to the SSL engine;
receive, from the SSL engine, a handshake response in view of the communication protocol of the handshake request, wherein the handshake response excludes information associated with the secure layer extension;
generate a modified handshake response in view of the identifier associated with the communication protocol, wherein the handshake response includes extension information associated with the secure layer extension;
provide a hash value in view of the modified handshake response; and
transmit the modified handshake response and the hash value to the client device to indicate that the handshake request is complete.

14. The non-transitory computer-readable storage medium of claim 13, wherein the processing device is further to identify, in view of the secure layer extension, an application-layer protocol negotiation (APLN) extension for the communication protocol.

15. The non-transitory computer-readable storage medium of claim 14, wherein the processing device is further to update a field in the handshake response in view of the APLN extension.

16. The non-transitory computer-readable storage medium of claim 14, wherein the processing device is further to append the APLN extension to the handshake response.

17. The non-transitory computer-readable storage medium of claim 13, wherein the processing device is further to:
identify a hash function in the handshake request from the client device; and
generate the hash value for the modified handshake response using the hash function.

* * * * *